(No Model.)
E. L. RAYNSFORD.
CAR COUPLING.
No. 297,293. Patented Apr. 22, 1884.
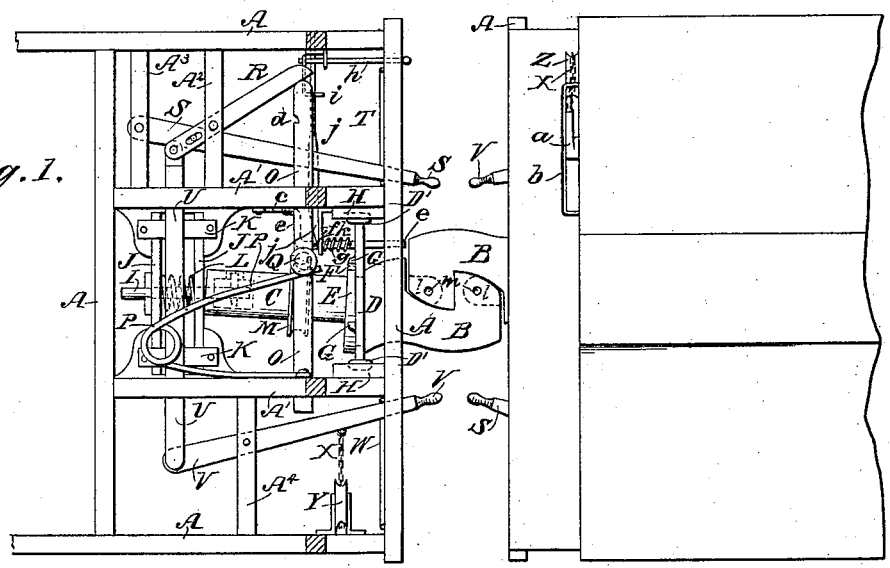
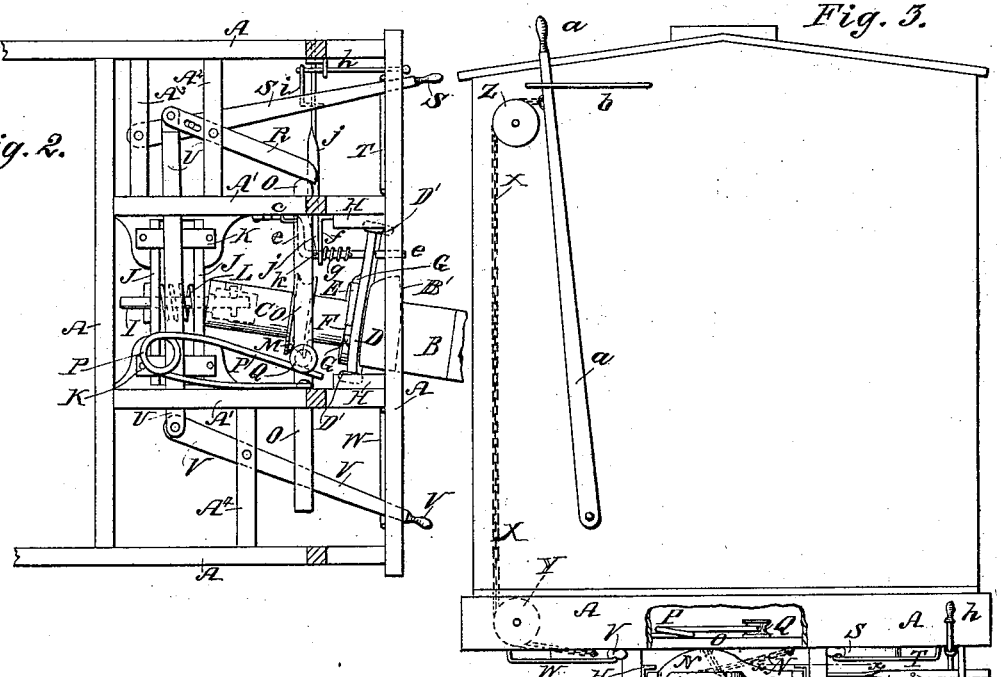
WITNESSES:
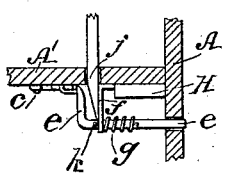
INVENTOR:
E. L. Raynsford
BY Munn & Co
ATTORNEYS.

UNITED STATES PATENT OFFICE.

EDWARD L. RAYNSFORD, OF SUSQUEHANNA, ASSIGNOR TO HIMSELF AND JOHN R. RAYNSFORD, OF MONTROSE, PENNSYLVANIA.

CAR-COUPLING.

SPECIFICATION forming part of Letters Patent No. 297,293, dated April 22, 1884.

Application filed September 27, 1883. (No model.)

*To all whom it may concern:*

Be it known that I, EDWARD L. RAYNSFORD, of Susquehanna, in the county of Susquehanna and State of Pennsylvania, have invented a new and Improved Car-Coupling, of which the following is a full, clear, and exact description.

Reference is to be had to the accompanying drawings, forming part of this specification, in which similar letters of reference indicate corresponding parts in all the figures.

Figure 1 is a plan view of my improvement shown with the parts in a coupled position. Fig. 2 represents the parts of the coupling in an uncoupled position. Fig. 3 is a front elevation of the same, parts being broken away. Fig. 4 is a plan view of the device for locking the hook in an uncoupled position, and in larger size.

The object of this invention is to promote convenience and security in the coupling and uncoupling of cars and reliability in the use of car-couplings. The coupling-hook and draw-bar are supported by a bearing-plate kept in place by a collar and provided with cross-head ends sliding in bearings attached to the car-frame. The bearing-plate and collar are provided with stops to limit the revolution of the draw-bar and coupling-hook, and the said draw-bar and hook are connected by a pulley and chain with a sliding bar, so that they will be revolved to couple and uncouple the cars by the movements of the said sliding bar. The sliding bar is provided with a notch, with which engages a spring-catch to hold the coupling-hook in an uncoupled position. With the sliding bar are connected a set of levers, a bar, and chain-pulleys and levers, so that the said bar can be operated to uncouple the cars from either side of the track and from the top of a car. The sliding bar is released and is moved to couple the cars when run together by a spring-held trip-rod and a spring. The spring-held trip-rod can be held from operating by a sliding bar having beveled end, and operated by a crank-rod and connecting-bar, as will be hereinafter fully described.

A represents the forward part of the base-frame of a car-body.

B is the draw-head, which is made in the form of a hook, with a rounded or inclined forward side, a square forward end, and square front and rear shoulders, so that when the hooks of two cars are interlocked, as shown in Fig. 1, the said hooks will serve as draw-heads to draw the cars and as bumpers to push or back the cars, as may be required. The shank or draw-bar C at the base of the hook B passes through a bearing-plate, D, and to the said shank, at the inner side of the bearing-plate D, is attached, or upon it is formed, a collar or flange, E. The groove or space between the base of the hook B and the collar or flange E is slightly inclined with respect to the axis of the hook B and draw-bar C, so as to throw the hook B slightly outward and forward when the said hook is turned in uncoupling the cars. The hook B in coupling and uncoupling is turned through a quarter of a revolution, its jaw being at the inner side of the said hook when in a coupled position, as shown in Figs. 1 and 3, and at the upper side of the said hook when in an uncoupled position, as shown in Fig. 2. The rotary movement of the hook B is limited by a stop, F, attached to or formed upon the collar E, and which strikes successively against stops G, attached to or formed upon the bearing-plate D.

To the ends of the bearing-plate D are attached, or upon them are formed, cross-heads D', which work in grooves or ways H, attached to the inner sides of the downwardly-projecting central sills, A', of the frame A, so that the said bearing-plate D can move forward or rearward, as draft or pressure may be applied to the hook B.

To the rear end of the draw-bar C is secured a rod, I, by a perforation and cross-pin or other suitable connection, that will form a strong and loose joint between the draw bar and rod. The rod I passes through the centers of two plates, J, and has a cross-pin or other suitable fastening attached to its rear end. The ends of the plates J rest in slot-bearings K, secured to the sills A', and upon the pin I, between the plates J, is placed a spiral or other spring, L, so that when draft is applied to the hook B the rear plate J will be drawn forward, compressing the spring L against the forward plate J, and when pressure is applied to the said hook B the forward plate J will be forced to the rearward, compressing the spring L against the rear plate J, to prevent a jar when the cars are started and stopped.

To the draw-bar C, a little in the rear of the collar E, is attached a grooved pulley, M, around which is passed, and to it is secured, a chain, N. The ends of the chain N cross each other, as shown in Fig. 3, and are attached to the bar O, which slides in bearings in the sills A', so that the draw-bar C and coupling-hook B can be turned to couple and uncouple the cars by sliding the said bar O forward and back. The bar O is forced forward, turning the bar C and hook B into and holding them in a coupled position by a strong spring, P, attached to the frame of the car-body, and pressing against a pin, Q, or other stop attached to the said bar O.

Against the forward end of the sliding bar O rests the end of a lever, R, which is fulcrumed to a bar, $A^2$, attached to the frame of the car-body.

In the lever R, at a little distance from its rear end, is formed a short slot, to receive a pin attached to the lever S, the rear end of which is pivoted to a bar, $A^3$, attached to the frame of the car-body. The lever S extends forward and projects at the forward end of the car, so that it can be readily reached and operated by an attendant standing at the side of the track to uncouple the cars. The lever S is supported in a horizontal position by a keeper, T, attached to the forward part of the frame A.

To the rear end of the lever R is pivoted the end of a bar, U, that slides in bearings in the sills A', and to its other end is pivoted the rear end of the lever V. The lever V is pivoted to a bar, $A^4$, attached to the frame of the car-body, and its forward end projects at the forward end of the car, so that it can be readily reached and operated by an attendant standing at the side of the track. The lever V is supported in a horizontal position by a keeper, W, attached to the forward part of the frame A. With this construction the coupling-hook B can be rotated to uncouple the cars by operating either of the levers S V.

To the lever V is attached the lower end of a chain, X, which passes around a guide-pulley, Y, pivoted to the frame A of the car-body, over a pulley, Z, pivoted to the upper part of the end of the car, and its upper end is attached to the upper part of the lever a. The lower end of the lever a is pivoted to the lower part of the end of the car-body, and its upper end projects above the top of the car, so that it can be readily operated to uncouple the cars by an attendant upon the said top of the car. The lever a is kept in position by a keeper, b, through which the said lever passes, and which is attached to the upper part of the end of the car.

c is a spring-catch attached to a sill, A', and which, when the bar O is pushed forward to uncouple the cars, engages with a notch, d, in the rear part of the edge of the said bar O, to lock the said bar O and the coupling-hook B in an uncoupled position.

e is a rod, the forward part of which slides in bearings in the forward part of the frame A and in a bracket, f, attached to a sill, A'. The rear part of the rod e is bent into crank form, and its rear end rests against the forward side of the spring-catch c, so that a rearward movement of the said rod e will push back the said spring-catch c to release the bar O and allow the draw-bar C and the coupling-hook B to be turned into a coupling position by the action of the spring P. The trip-rod e is held forward by a spiral spring, g, placed upon its forward part, and the forward end of which is attached to the said rod e. The rear end of the spring g rests against the bracket f. The trip-rod e extends forward, so that its forward end will be in line with the shoulder B', formed upon the side of the hook B in line with the rear shoulder of the said hook, which shoulder B' serves as a bumper for the end of the hook of the adjacent car to strike against, and also serves as a stop to stop the hooks in proper position to interlock with each other when the said hooks are turned by the action of the spring P. With this construction, when the cars are run together, the ends of the hooks B strike against the shoulders B', forcing the said hooks back against the tension of the springs J and allowing the ends of the said hooks to strike against and force back the rods e, releasing the bars O and allowing the springs P to turn the said hooks B, coupling the cars.

h is a rod working in bearings attached to the frame A, and which has a crank-arm upon each end, the forward crank-arm serving as a handle for operating said rod.

To the rear crank-arm of the rod h is pivoted the end of a short connecting-bar, i, the other end of which is pivoted to the bar j. The bar j slides in bearings attached to the frame A, and has its forward end inclined, tapered, or beveled upon one side. The bar j is placed in such a position that its beveled forward end will pass between the bracket f and a stop-pin, k, attached to the rod e, so that by operating the crank-rod h the bar j will be forced forward, forcing the inner end of the said rod e away from the spring-catch c, so that the said catch will not be released when the cars are run together, thus allowing the cars to be run together without being coupled.

In the forward end of each coupling-hook B is formed a recess, l, and a hole, m, to receive an ordinary coupling link and pin, when it is desired to couple a car provided with my improved coupling with a car provided with the ordinary link-and-pin coupling.

Having thus described my invention, what I claim as new, and desire to secure by Letters Patent, is—

1. In a car-coupling, the combination, with the coupling-hook B, the draw-bar C, and the sills A', of the collar E, the bearing-plate D, having cross-heads D', and the slide-bearings H, substantially as herein shown and described, whereby the coupling-hook and draw-bar are suspended and allowed to turn and slide freely, as set forth.

2. In a car-coupling, the combination, with the collar E and the sliding bearing-plate D, of the stops F G, substantially as herein shown and described, whereby the rotation of the draw-bar and coupling-hook is limited, as set forth.

3. In a car-coupling, the combination, with the draw-bar C and the frame A, of the pulley M, the chain N, the sliding bar O, and an operating mechanism, substantially as herein shown and described, whereby the said draw-bar and the coupling-hook can be turned to couple and uncouple the cars, as set forth.

4. In a car-coupling, the combination, with the sliding bar O, having notch d, of the spring-catch c, substantially as herein shown and described, whereby the coupling-hook B is locked in an uncoupled position, as set forth.

5. In a car-coupling, the combination, with the sliding bar O and the frame A, of the levers R S, substantially as herein shown and described, whereby the cars can be uncoupled from one side of the track, as set forth.

6. In a car-coupling, the combination, with the frame A and the levers R S, of the sliding bar U and the lever V, substantially as herein shown and described, whereby the cars can be uncoupled from either side of the track, as set forth.

7. In a car-coupling, the combination, with the lever V and the car-body, of the chain X, the pulleys Y Z, and the lever a, substantially as herein shown and described, whereby the cars can be uncoupled from the top of the car, as set forth.

8. In a car-coupling, the combination, with the frame A, the sliding bar O, and the spring-catch c, of the spring P and the spring-held trip-rod e, substantially as herein shown and described, whereby the cars, when run together, will be coupled automatically, as set forth.

9. In a car-coupling, the combination, with the frame A and the spring-held trip-rod e, of the sliding bar j, having beveled end, the connecting-bar i, and the crank-rod h, substantially as herein shown and described, whereby the said trip-rod will be held from operating, as set forth.

EDWARD L. RAYNSFORD.

Witnesses:
THOMAS HESKETH,
WM. MILES, Jr.